United States Patent
Kurihara et al.

(10) Patent No.: US 6,311,493 B1
(45) Date of Patent: Nov. 6, 2001

(54) TURBO CHARGING SYSTEM OF DIESEL ENGINE

(75) Inventors: Hirokazu Kurihara; Takao Kodaira; Toshiaki Adachi; Takao Fujisaki; Takao Inoue; Naoki Yanagisawa, all of Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/712,684

(22) Filed: Nov. 14, 2000

(30) Foreign Application Priority Data

Nov. 17, 1999 (JP) .................................................. 11-327236

(51) Int. Cl.$^7$ .................................................. F02D 23/00
(52) U.S. Cl. .................................. 60/600; 60/602; 60/612
(58) Field of Search .......................... 60/600, 602, 605.1, 60/611, 612

(56) References Cited

U.S. PATENT DOCUMENTS

| | | | |
|---|---|---|---|
| 4,809,506 | * 3/1989 | Lauritsen | 60/612 X |
| 5,003,781 | * 4/1991 | Shibata et al. | 60/612 X |
| 5,020,327 | * 6/1991 | Tashima et al. | 60/600 |
| 5,063,744 | * 11/1991 | Ishiyama et al. | 60/612 X |
| 5,133,228 | * 7/1992 | Takata et al. | 60/600 X |
| 5,140,817 | * 8/1992 | Matsuda et al. | 60/612 |

FOREIGN PATENT DOCUMENTS 2-112618    4/1990    (JP) .

* cited by examiner

Primary Examiner—Hoang Nguyen
(74) Attorney, Agent, or Firm—McCormick, Paulding & Huber LLP

(57) ABSTRACT

A turbo charger system (32) for a diesel engine (1) with a simple structure, but improved in output, torque and fuel consumption rate. A high-stage turbine (3) and low-stage turbine (4) are provided in series on an exhaust gas line (2) of the engine (1). A high-stage compressor (6), which is connected to the high-stage turbine (3), and a low-stage compressor (7), which is connected to the low-stage turbine (4), are provided in series on an intake air line (5) of the engine (1). A bypass line (20) with a valve (21) is provided over the high-stage turbine (3). The bypass valve (21) is completely or substantially completely closed until the engine (1) reaches its maximum torque point (14) so as to raise a supercharging pressure. From the maximum torque point (14) to the maximum output point (15), the bypass valve (21) is gradually opened to adjust the supercharging pressure. The bypass valve is completely or substantially completely opened at the maximum output point (15) to suppress the supercharging pressure.

23 Claims, 4 Drawing Sheets

HIGH – STAGE COMPRESSOR 6

FIG. 2B

LOW – STAGE COMPRESSOR 7

HIGH – STAGE COMPRESSOR

FIG. 4B

LOW – STAGE COMPRESSOR

TURBO CHARGING SYSTEM OF DIESEL ENGINE

BACKGROUND OF THE INVENTION

1. Field of the Invention

The present invention generally relates to a turbo charging system for a diesel engine, and more particularly to such a turbo charging system that can improve both engine performance and fuel consumption rate with a simple construction and control.

2. Description of the Related Art

Figure 5:
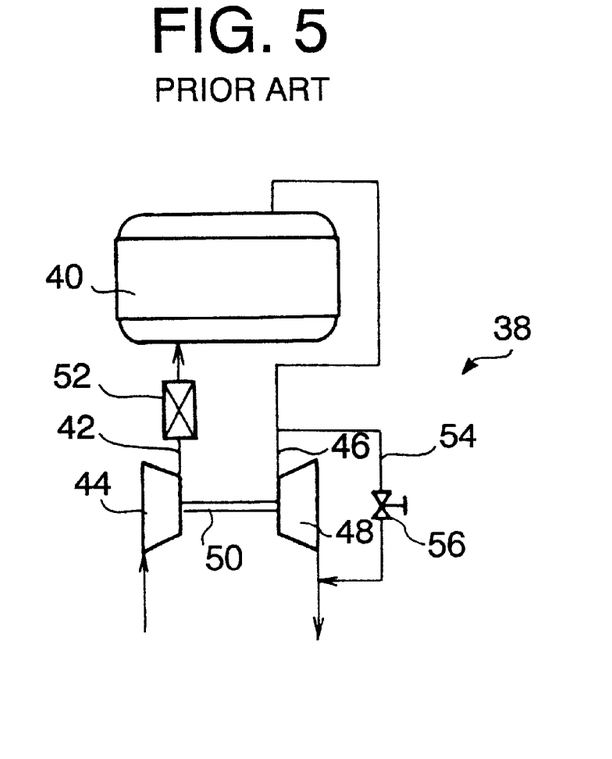
FIG. 5 illustrates a conventional one-stage turbo charger system.

Diesel engines are suited for a turbo charger since unlike gasoline engines there is no need to adjust an amount of intake air for engine performance (output) control. A typical structure of a turbo charger system for a diesel engine is illustrated in FIG. 5 of the accompanying drawings. This is a one-stage turbo charger.

As illustrated, this turbo charger system 38 includes a compressor 44 provided on an intake air passage 42 of a diesel engine 40, a turbine 48 provided on an exhaust gas passage 46, and a rotating shaft 50 connecting the compressor 44 with the turbine 48. As the turbine 48 is rotated by an exhaust gas flowing in the exhaust gas line 46, its rotation is transmitted to the compressor 44 via the shaft 50. The compressor 44 then pressurizes the intake air and feeds it to the engine 40. An after cooler 52 is optionally provided between the compressor 44 and engine 40.

If engine revolution speed rises and exhaust gas flow rate (mass flow) correspondingly increases, a rotational speed of the turbine 48 rises and simultaneously the compressor 44 rotates at an increased speed. As a result, a supercharging pressure to the engine 40 may become excessively high. In order to avoid it, a bypass line 54 is provided on the exhaust gas line 46 over the turbine 48, and a bypass valve 56 is provided on the bypass line 54 for causing part of the exhaust gas to bypass the turbine 48 when the supercharging pressure exceeds a predetermined value. By opening the bypass valve 56, the rotational speed of the turbine 48 can be suppressed, i.e., the rotational speed of the compressor 44 can be suppressed. Consequently, the supercharging pressure is controlled.

Figure 6:
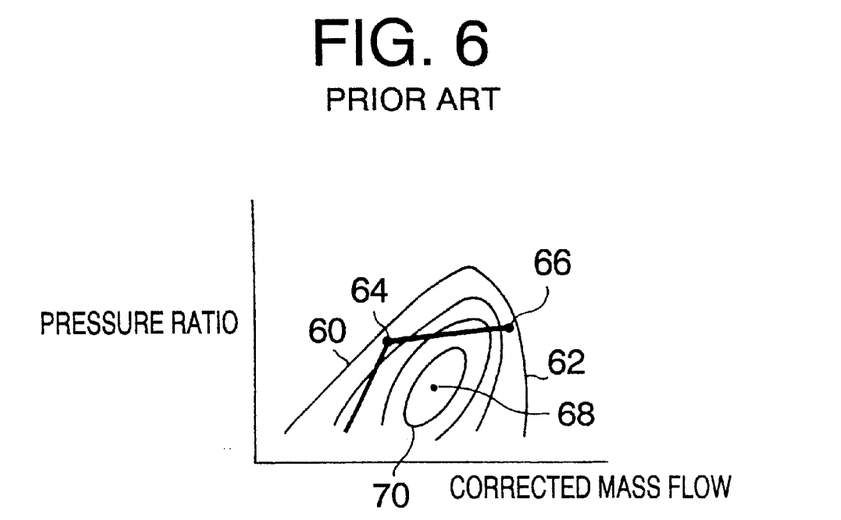
FIG. 6 illustrates a characteristics curve of a compressor used in the turbo charger system shown in FIG. 5.

Referring now to FIG. 6 of the accompanying drawings, illustrated is a performance map of the compressor 44 of the turbo charger system 38 shown in FIG. 5, together with an engine performance curve (operation curve) when running under a full load condition. The curve 60 indicates a surge limitation, the curve 62 a maximum rotation limit, the point 64 a maximum torque of the engine 40, the point 66 a maximum output of the engine 40, the point 68 a maximum efficiency of the compressor 44, and the multi-circle 70 iso-efficiency curves of the compressor 44. As understood from this diagram, when the engine 40 is running under the full load condition, the bypass valve 56 is closed until the engine demonstrates the maximum torque 64 (i.e., until the engine revolution speed reaches a corresponding value), and if the engine revolution speed exceeds that value, the bypass valve 56 is gradually opened to control the supercharging pressure.

The vertical axis of the graph shown in FIG. 6 indicates a pressure ratio, and the horizontal axis indicates a corrected mass flow, which are given by the following equations respectively:

Pressure ratio=total pressure at compressor outlet/total pressure at compressor inlet Corrected mass flow=(measured mass flow×(inlet temperature/reference temperature)$^{0.5}$)/(inlet pressure/reference pressure)

where the reference temperature=20° C. (reference value for correction), and
the reference pressure=atmospheric pressure (reference value for correction).

When the engine output and torque should be raised in the above described turbo charger system 38, the turbine 48 may be tuned so that the turbine rotational speed is raised relative to the same exhaust gas flow rate (i.e., same engine revolution speed) and the compressor rotational speed is raised as well. This shifts the operation curve upwards in the graph of FIG. 6 so that it passes a high pressure ratio area. However, as the pressure ratio is raised, the efficiency drops, i.e., the high pressure ratio area is a low efficiency area. Thus, raising the operation curve into the high pressure ratio area results in deterioration of fuel consumption ratio.

Figure 8:
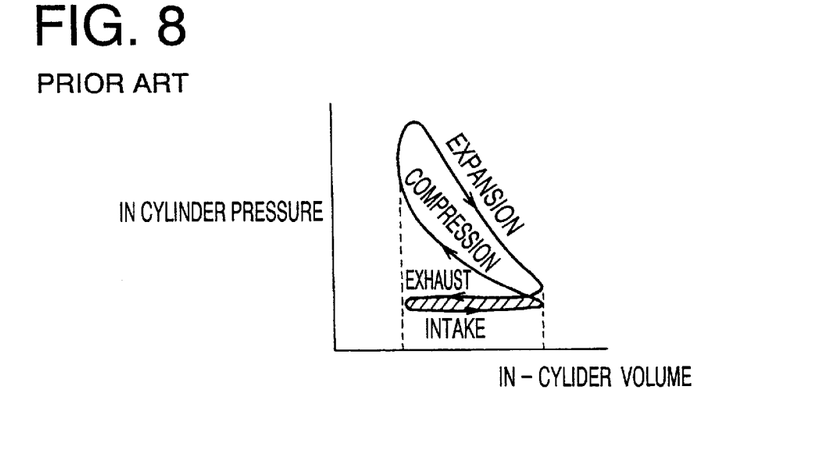
FIG. 8 is a pressure-volume diagram particularly showing pumping loss.

Specifically, if the pressure ratio is raised and a low compressor efficiency area is used as mentioned above, the turbine 48 must perform more work (torque of the rotating shaft 50) in order to raise the intake air pressure (supercharging pressure). This brings about exit clogging of the exhaust gas, which raises the exhaust gas pressure. As a result, as shown in FIG. 8, the intake air pressure does not exceed the exhaust gas pressure, and pumping loss occurs as indicated by the shaded area. This deteriorates the fuel consumption rate. Here, the intake air pressure is an air pressure downstream of the compressor 44, and the exhaust gas pressure is an air pressure upstream of the turbine 48.

Even if the engine output and torque are suppressed and a low compressor pressure ratio area is used, the operation curve inevitably passes the low efficiency area because the centrifugal compressor 44 has a high efficiency area in a narrow flow rate range due to its structure whereas the automobile engine 40 is operated in a wide rotation speed range and the exhaust gas has a wide flow rate range. Thus, for the reason mentioned earlier, there is only a limited range of good fuel consumption rate, and it is difficult to improve the fuel consumption rate as a whole.

There is also known a variable displacement turbo charger system which aims to improve the fuel consumption rate. By changing a turbine displacement (capacity) in accordance with change of the exhaust gas flow rate, this turbo charger system intends to adjust the turbine rotational speed such that the compressor is used in a high efficiency area as much as possible. However, since the turbine displacement is variable, throttle loss occurs and exhaust gas pressure increases. Further, the variable range itself is limited. Accordingly, great improvement cannot be expected on the fuel consumption rate. In addition, a variable displacement turbine requires a complicated mechanism. This raises a manufacturing cost.

Another type of conventional turbo charger system includes two turbo chargers having different characteristics. In this system, two compressors are provided in series on intake air line of an engine and two turbines are provided on an exhaust gas line. This is a two-stage turbo charger system.) Each of the compressors and turbines has a bypass line with a bypass valve, and these bypass valves are closed and opened according to the engine running condition such that the two turbo chargers are selectively operated. In this arrangement, when one of the turbo chargers is driven, the other turbo charger is fundamentally deactivated (full switching type). Accordingly, timing control for switching is difficult, i.e., it requires complicated control.

SUMMARY OF THE INVENTION

One of the objects of the present invention is to a turbo charger system for a diesel engine that has a simple structure and operates under less complicated control, but can raise output and torque and improve fuel consumption rate.

According to one aspect of the present invention, there is provided a turbo charger system for a diesel engine including high- and low-stage turbines provided in series on an exhaust gas line of the engine, high- and low-stage compressors provided in series on an intake air of the engine such that the high-stage compressor is operatively coupled to the high-stage turbine and the low-stage compressor is operatively coupled to the low-stage turbine, a bypass line with a valve provided on the exhaust gas line such that the bypass line bypasses the high-stage turbine, and a controller for controlling an opening degree of the bypass valve such that the bypass valve is completely or substantially completely closed until the diesel engine reaches its maximum torque point at least when the engine is running under a full load condition, gradually opened from the maximum torque point to a maximum output point of the engine, and completely or substantially completely opened at the maximum output point.

The controller may control the opening degree of the bypass valve in accordance with an engine revolution speed. The controller may control the opening degree of the bypass valve such that a pressure ratio near the maximum torque point is greater than that near the maximum output point in the high-stage compressor, and a pressure ratio near the maximum output point is greater than that near the maximum torque point in the low-stage compressor. The controller may control the opening degree of the bypass valve such that a pressure ratio near the maximum output point is greater in the low-stage compressor than the high-stage compressor. The controller may control the opening degree of the bypass valve such that a pressure ratio near the maximum torque point is greater in the high-stage compressor than the low-stage compressor. The high-stage compressor may have a smaller maximum pressure ratio than the low-stage compressor and have a wider high efficiency flow rate range relative to a maximum flow rate than the low-stage compressor. A supercharging pressure may solely be controlled by the opening degree of the bypass valve.

DETAILED DESCRIPTION OF THE INVENTION

Now, embodiments of the present invention will be described in reference to the accompanying drawings.

Figure 1:
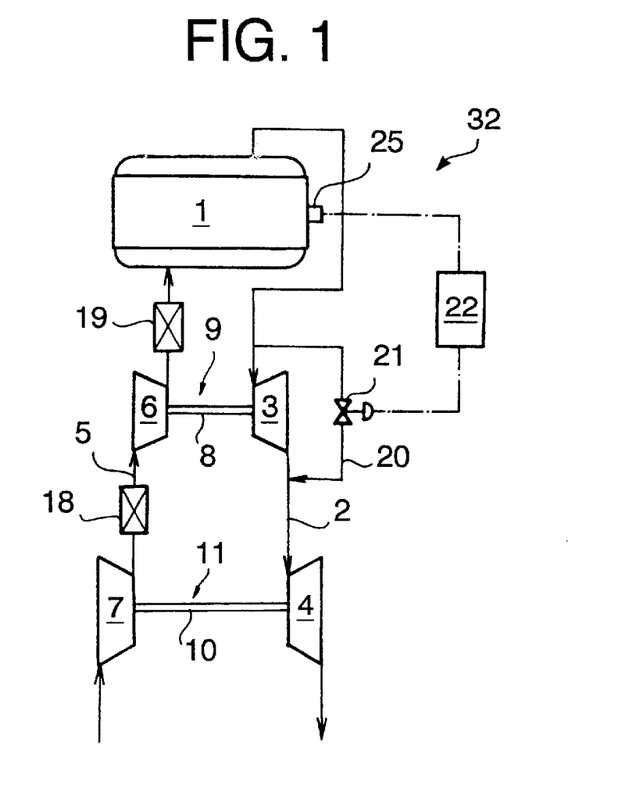
FIG. 1 illustrates a turbo charger system for a diesel engine according to one embodiment of the present invention.

Referring to FIG. 1, illustrated is a diesel engine 1 having a high-stage turbine 3 and low-stage turbine 4 on an exhaust gas line 2. These two turbines 3 and 4 are spacedly arranged in series in an exhaust gas flow direction. On an intake air passage 5 of the engine 1, provided are a high-stage compressor 6 and low-stage compressor 7. These two compressors are centrifugal compressors and spacedly arranged in series in an intake air flow direction. The high-stage turbine 3 and high-stage compressor 6 are connected to each other by a rotating shaft 8, thereby constituting a high-stage turbo unit 9. Likewise, the low-stage turbine 4 and low-stage compressor 7 are connected to each other by a second rotating shaft 10, thereby constituting a low-stage turbo unit 11.

Figure 2A:
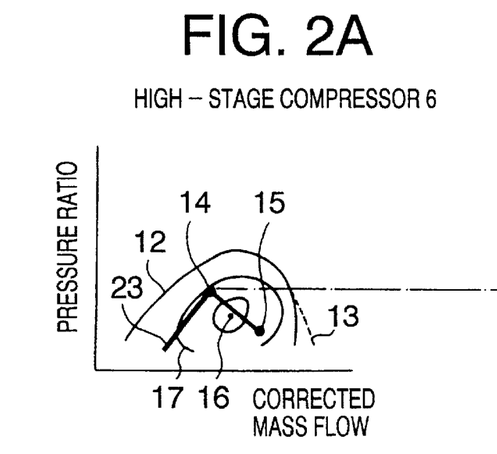
FIG. 2A illustrates a characteristics curve of a high-stage compressor used in the turbo charger system shown in FIG. 1.
Figure 2B:
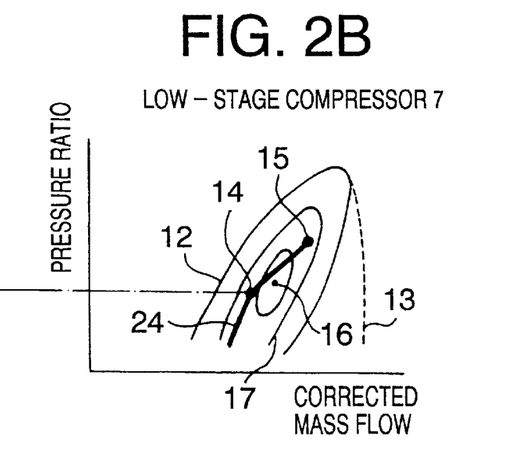
FIG. 2B illustrates a characteristics curve of a low-stage compressor used in the turbo charger system shown in FIG. 1.

As understood from FIGS. 2A and 2B, the low-stage turbo unit 11 has a greater capacity (displacement) than the high-stage turbo unit 9. Specifically, a corrected mass flow of the low-stage compressor 7 (FIG. 2B) is greater than that of the high-stage compressor 6 (FIG. 2A). The maximum pressure ratio of the high-stage compressor 6 is lower than that of the low-stage compressor 7. The high-stage compressor 6 has a wider flow rate range for good efficiency than the low-stage compressor 7 relative to the associated mass flow range. In other words, the high-stage compressor 6 possesses a higher ratio of high-efficiency flow rate range to the maximum corrected mass flow than the low-stage compressor 7.

Because of its inherent structure, each of the centrifugal compressors 6 and 7 has a narrow good-efficiency range if the pressure ratio is raised, and has a wide good-efficiency range if the pressure ratio is lowered. In other words, it is not possible to have both a high pressure ratio and wide good-efficiency range. In consideration of this reality, the high-stage compressor 6 of the illustrated embodiment has a characteristics of low pressure ratio and wide good-efficiency range, and the low-stage compressor 7 has a characteristics of high pressure ratio and narrow good-efficiency range.

In each of the diagrams shown in FIGS. 2A and 2B, the curve 12 indicates a surge limit, the curve 13 indicates a maximum rotational speed of the compressor, the point 14 indicates a maximum torque of the engine, the point 15 indicates a maximum output of the engine 1, the point 16 indicates a highest efficiency of the compressor, and multiple circles 17 indicate iso-efficiency lines of the compressor. The definitions of the terms "pressure ratio" and "corrected mass flow" are the same as those mentioned in the "Background of the Invention" of this specification, and shown below again.

Pressure ratio=compressor outlet total pressure/compressor inlet total pressure

Corrected mass flow=(measured mass flow×(inlet temp/reference temp)$^{0.5}$)/(inlet pressure/reference pressure) where the reference temperature=20° C.
(reference value for correction), and
the reference pressure=atmospheric pressure (reference value for correction).

Referring back to FIG. 1, an intercooler 18 is provided on the intake air passage 5 between the high-stage compressor 6 and low-stage compressor 7. Between the high-stage compressor 6 and engine 1, provided is an aftercooler 19. The intercooler 18 and aftercooler 19 cool the intake air of which temperature is elevated due to compression. It should be noted, however, that the intercooler and aftercooler are not indispensable elements to the present invention. For instance, one or both of them may be dispensed with.

On the exhaust gas line 2, there is provided a bypass line 20 over the high-stage turbine 3. An exhaust bypass valve 21 is associated with this bypass line 20. The valve 21 is utilized to adjust a flow rate (mass flow) of the exhaust gas flowing in the bypass line 20 by changing its opening degree from 0 to 100%. The opening degree of the valve 21 is controlled by a main controller 22.

The main controller 22 adjusts the bypass valve 21 in the following manner during at least a full load condition of the engine 1; (1) the bypass valve 21 is completely or almost closed until the maximum torque point 14 of the engine 1, (2) the bypass valve 21 is gradually opened from the maximum torque point 14 to the maximum output point 15, and (3) the bypass valve 21 is completely or almost opened at the maximum output point 15.

It should be noted that the opening degree of the bypass valve 21 may also be controlled when the engine 1 is operated under a medium and/or light load condition. The way of opening the bypass valve 21 may be stepwise or stepless.

Under the above described control on the bypass valve 21, operation curves 23 and 24 of the compressors 6 and 7 are drawn as depicted in FIGS. 2A and 2B. Each of the operation curves passes a high efficiency area from the maximum torque point 14 to the maximum output point 15.

The main controller 22 controls the opening degree of the bypass valve 21 such that regarding the high-stage compressor 6 the pressure ratio near the engine maximum torque point 14 is greater than that near the engine maximum output point 15, and regarding the low-stage compressor 7 the pressure ratio near the maximum output point 15 is greater than that near the maximum torque point 14. Further, the main controller 22 controls the opening degree of the bypass valve 21 such that the pressure ratio of the low-stage compressor 7 is greater than that of the high-stage compressor 6 in the vicinity of the maximum output point 15. Moreover, the main controller 22 controls the opening degree of the bypass valve 21 such that the pressure ratio of the high-stage compressor 6 is equal to or greater than that of the low-stage compressor 7 in the vicinity of the maximum torque point 14.

An inner diameter of the bypass line 20 is smaller than the exhaust gas line 2 to insure a certain pressure difference between the upstream and downstream of the high-stage turbine 3 even if the bypass valve 21 is completely opened during the engine full load condition. This pressure difference causes the high-stage turbine 3 to be slightly driven. If there were no pressure difference across the high-stage turbine 3, the high-stage turbine 3 would not be actuated by the exhaust gas, and the high-stage compressor 6 would become a resistance in the intake air line 5. It should be noted that the full open of the bypass valve 21 under the engine full load condition may be defined by the opening degree of the bypass valve 21 which insures the above mentioned certain pressure difference across the high-stage turbine 3.

The main controller 22 detects (or determines) the maximum torque point 14 and maximum output point 15 of the engine 1 from an engine revolution speed sensed by an engine revolution speed sensor 25 (FIG. 1). To this end, an engine revolution speed at which the engine 1 demonstrates the maximum torque and an engine revolution speed at which the engine 1 demonstrates the maximum output are measured/calculated beforehand under the engine full load condition. When the sensor 25 detects such engine revolution speed, the main controller 22 judges that the maximum torque point 14/maximum output point 15 is reached.

Because the above described control is applied to the bypass valve 21 and the turbo units 9 and 11 (particularly the compressors 6 and 7) possess the above described characteristics, the operation curves 23 and 24 of the compressors 6 and 7 extend through good efficiency areas respectively from the maximum torque point 14 to the maximum output point 15 during the engine full load condition as illustrated in FIGS. 2A and 2B. Specifically, since the bypass valve 21 is maintained closed until reaching the maximum torque point 14 under the engine full load condition, the pressure ratios of both the compressors 6 and 7 rise as the engine revolution speed increases.

When the engine 1 reaches the maximum torque point 14 under the full load condition, the bypass valve 21 starts opening so that the pressure ratio of the high-stage compressor 6 drops with the increasing engine revolution speed. When the engine revolution speed further rises and the engine 1 arrives at the maximum output point 15, the bypass valve 21 is completely opened. Thus, the pressure ratio of the high-stage compressor 6 no longer increases. As a result, the operation curve 23 of the high-stage compressor 6 advances in its low maximum-pressure ratio and wide (relative to the maximum corrected mass flow) high-efficiency area (i.e., short and long gentle slope mountain-like area), as compared with the low-stage compressor 7, diagonally right and downward as shown in FIG. 2A.

In the low-stage compressor 7, after the engine 1 reaches the maximum torque point 14 under the full load condition, the pressure ratio rises to the maximum output point 15 with the increasing engine revolution speed. As a result, the operation curve 24 of the low-stage compressor 7 passes its high maximum-pressure ratio and narrow high-efficiency area (i.e., high and steep slope mountain-like area) diagonally right and upward as shown in FIG. 2B.

In this manner, the compressors 6 and 7 have different properties, and the operation curves 23 and 24 proceed through the respective high efficiency areas of the compressors 6 and 7, so that it is possible to realize both high torque/high output and low fuel consumption rate. In the conventional arrangement (one-stage turbo charger system 38) shown in FIGS. 5 and 6, on the other hand, the value of pressure ratio and the shape of high efficiency area of the compressor 44 are balanced (compromised). Thus, neither the pressure ratio nor the efficiency has a high value from the maximum torque point 64 to the maximum output point 66 under the engine full load condition.

As compared with the one-compressor turbo charger system 38 shown in FIG. 5, the present invention system 32 employs the high-stage compressor 6 of low maximum-pressure ratio and wide high-efficiency area and the low-stage compressor 7 of high maximum-pressure ratio and narrow high-efficiency area. In short, the turbo charger system 32 of the invention has two different types of compressor 6 and 7, and the bypass valve 21 is controlled such that the operation curves 23 and 24 pass the high efficiency areas of the respective compressors 6 and 7 from the maximum torque point 14 to the maximum output point 15 during the engine full load condition. Accordingly, it is possible to realize both high output/high torque of the engine and low fuel consumption rate.

The present invention can be described in the following way if considered from another point of view. In general, since the intake air is not throttled for output adjustment in the diesel engine 1, the flow rate of the exhaust gas increases in approximate proportion to the engine revolution speed regardless of the output being small or large. Thus, the low-stage compressor 7 has the characteristics shown in FIG. 2B, increasing to upward right like a steep mountain. This low-stage compressor 7 is always utilized as a main compressor with its exhaust gas being not bypassed. The pressure ratio is raised in proportion to the exhaust gas flow rate, i.e., the engine revolution speed. Since the area extending to upper right is an area of high efficiency, fundamental improvement is given to the efficiency regardless of the engine revolution speed being high or low.

As illustrated in FIG. 2A, the high-stage compressor 6 has a relatively small hill-like characteristics curve with gentle slope. The exhaust gas that would cause excessive supercharging is bypassed by opening the bypass valve 21 from the maximum torque point 14 to the maximum output point 15. This bypass control changes the flow rate of the exhaust gas into the wide high-efficiency area. As a result, the efficiency is raised during the supercharging pressure control between the maximum torque point 14 and the maximum output point 15.

In the illustrated embodiment, as described above, the two compressors 6 and 7 having different pressure ratio-corrected mass flow characteristics are controlled by manipulating the bypass valve 21 such that the respective operation curves 23 and 24 pass the high-efficiency areas from the maximum torque point 14 to the maximum output point 15 under the full load condition of the engine 1. Thus, the turbo charger units 9 and 11 can supercharge at high efficiency even when the engine revolution speed is high. Consequently, it is possible to obtain high output/high torque and low fuel consumption rate at the same time.

Figure 7:
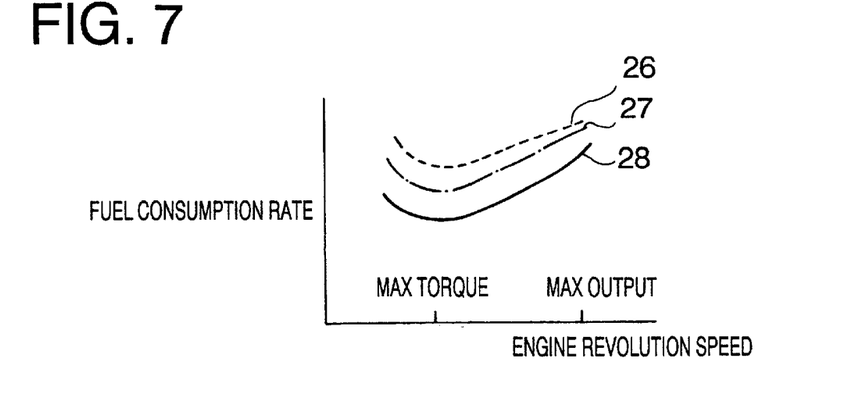
FIG. 7 illustrates fuel consumption rate curves of the turbo charger systems shown in FIGS. 1, 3 and 5.

FIG. 7 illustrates a result of fuel consumption rate test. The broken line 26 indicates the fuel consumption rate of a common one-stage variable displacement turbo charger system, the solid line 28 indicates the fuel consumption rate of the two-stage turbo charger system of the present invention controlled in accordance with the above described manner, and the intermediate single-dot chain line 27 indicates the fuel consumption rate of another two-stage turbo charger system having two almost identical compressors and controlled in a manner similar to the one-stage turbo charger system 38.

Figure 3:
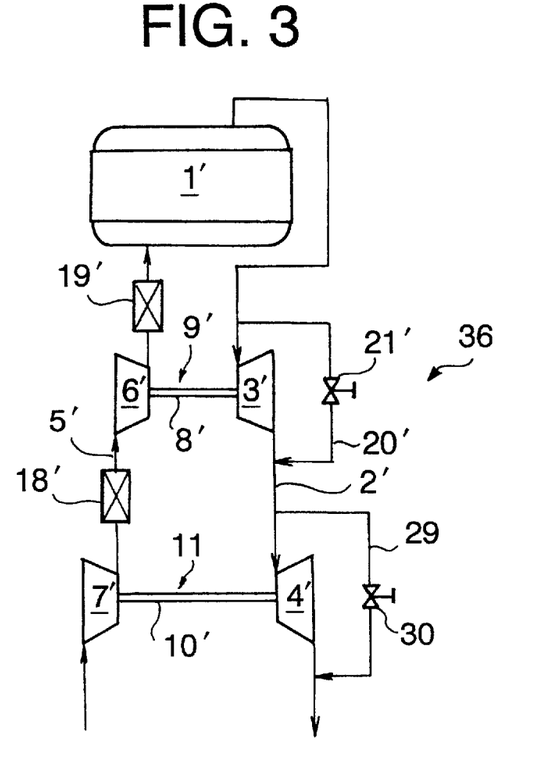
FIG. 3 illustrates a two-stage turbo charger system conceived by the inventors to be compared with the turbo charger system shown in FIG. 1.
Figure 4A:
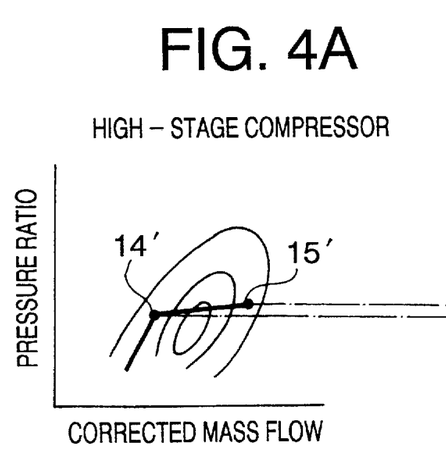
FIG. 4A illustrates a characteristics curve of a high-stage compressor used in the turbo charger system shown in FIG. 3.
Figure 4B:
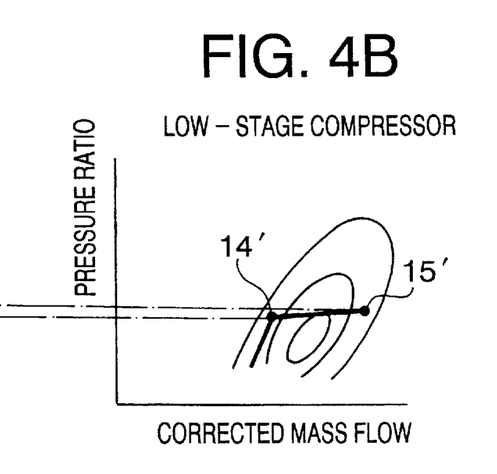
FIG. 4B illustrates a characteristics curve of a low-stage compressor used in the turbo charger system shown in FIG. 3.

The structure of the two-stage turbo charger system represented by the intermediate curve 27 is illustrated in FIG. 3. Similar reference numerals are used in FIGS. 3 and 1 to designate similar elements. The characteristics curves of the two compressors 6' and 7' are depicted in FIGS. 4A and 4B. Except for the corrected mass flow being greater in the low-stage compressor 7' than the high-stage compressor 6', fundamental characteristics of the compressors are similar to each other. Another difference, as compared with the turbo charger system 32 of the invention (FIG. 1), lies in that a second bypass line 29 and bypass valve 30 are provided for the low-stage compressor 7'. Both of the bypass valves 21' and 30 are closed until the maximum torque point 14' under the engine full load condition. Thus, the pressure ratio increases with the increasing engine revolution speed (increasing corrected mass flow) until the maximum torque point 14'.

From the maximum torque point 14' to the maximum output point 15', the bypass valves 21' and 30 are gradually opened such that the supercharging pressure is maintained approximately constant. Upon opening the bypass valves 21' and 30, the exhaust gas is caused to bypass the turbines 3' and 4' so that the pressure ratios of the compressors 6' and 7' are maintained approximately constant. The characteristics of each compressor 6', 7' in this system 36 is similar to that of the one-stage turbo charger system shown in FIG. 6. Thus, both the pressure ratio and efficiency are compromised. Accordingly, the operation curves do not pass the high-efficiency areas from the maximum torque point 14 to the maximum output point 15 under the engine full load condition.

In FIG. 7, therefore, the turbo charger system 36 having the intermediate structure and control as indicated by the single-dot line 27 has a better fuel consumption rate than the one-stage turbo charger system 38 of the broken line 26, but has a worse fuel consumption rate than the turbo charger system 32 of the present invention (solid line 28). In case of a direct-injection turbo-charged diesel engine with 2-liter displacement, the difference between the solid and single-dot lines 28 and 27 is about 10 g/kWh.

Figure 9:
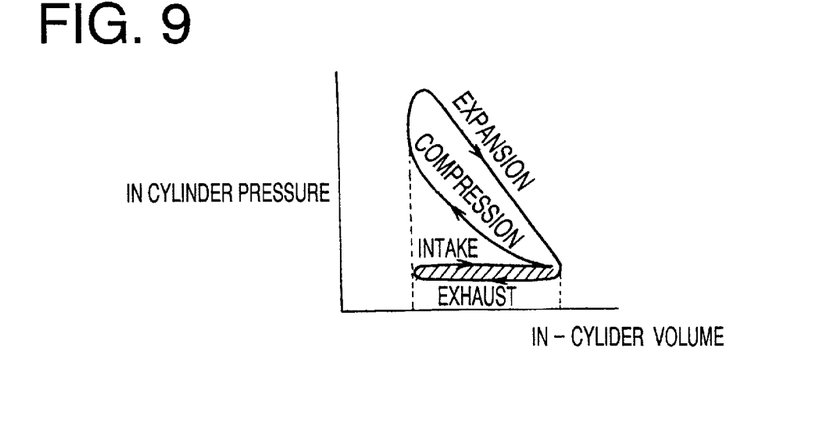
FIG. 9 is a similar pressure-volume diagram showing pumping gain.

How the fuel consumption rate is improved by the invention will be described using different diagrams (FIGS. 8 and 9). FIG. 8 illustrates a P-V diagram (pressure-volume diagram while the engine is running) of the one-stage variable displacement turbo charger system, and FIG. 9 illustrates that of the two-stage turbo charger system 32 of the present invention (FIG. 1). An integral value of $\int Pdv$ (intake→compression→expansion→exhaust) is proportional to the output/torque of the engine 1. In the diagram, a clockwise loop is an output, and a counterclockwise loop is a loss.

As shown in FIG. 8, the one-stage variable displacement turbo charger system has a counterclockwise loop in the intake and exhaust processes when high supercharging takes place (when highly boosted), so that a loss (pumping loss) occurs. This is because the operation curve of the one-stage variable displacement turbo charger system must pass the low efficiency area (FIG. 6) when operated under the high boost condition as mentioned earlier. In this case, in order to raise the intake air pressure, the turbine is required to perform more work (shaft torque) and the exhaust gas pressure is raised.

On the other hand, the two-stage turbo charger system 32 of the invention has a clockwise loop in the intake and exhaust processes during the high boost operation as illustrated in FIG. 9. Thus, an output (pumping gain) is obtained. This is because, as described above, the two-stage turbo charger system 32 is operated in the high efficiency area even when highly boosted. In this case, power (shaft torque) needed to raise the intake air pressure is small, the turbines are required to perform less work, and the exhaust gas pressure is not raised.

As understood from the foregoing, the two-stage turbo charger system 32 of the embodiment can demonstrate a greater output than the one-stage variable displacement turbo charger system when a same amount of fuel is fed. Therefore, the fuel consumption rate is improved. It should be noted that when the one-stage variable displacement turbo charger system is operated in the low pressure ratio area (when the output and torque are relatively low), a pumping gain is obtained, and when the two-stage turbo charger system 36 of FIG. 3 is used, it can have a pumping gain in a greater range than the one-stage variable displacement turbo charger system. However, the two-stage turbo charger system shown in FIG. 1 can have a greater pumping gain in a wider range than these two turbo charger systems.

In the two-stage turbo charger system 32 of FIG. 1, the two turbo units 9 and 11 are controlled by controlling (opening and closing) the single bypass valve 21 on the bypass line 20 extending over the high-stage turbine 3. Therefore, this two-stage turbo charger system is substantially a variable displacement system, but has a simpler structure than the one-stage variable displacement turbo charger system (VGS (Variable Geometry System). This contributes to cost reduction.

It should be noted that a bypass line and valve may be provided for the low-stage turbine 4. Further, another bypass line(s) and valve(s) may be provided for one or both of the high-stage compressor 6 and low-stage compressor 7.

Ideal control target values for the compressors 6 and 7 are shown below.

It should be noted, however, that the embodiment of the invention is not limited in this regard.

When the characteristics of the engine 1 satisfy:

the engine revolution speed at the maximum torque point 14×2=the engine revolution speed at the maximum output point 15, and the load at the maximum torque point 14×0.9=the load at the maximum output point 15, then the turbo units 9 and 11 having appropriate displacement are employed and the bypass valve 21 is controlled such that:

in the high-stage compressor 6, the pressure ratio at the maximum torque point 14×0.7=approximately the pressure ratio at the maximum output point 15, in the low-stage compressor 7, the pressure ratio at the maximum torque point 14×1.4=approximately the pressure ratio at the maximum output point 15, and regarding the maximum output point 15, the pressure ratio in the high-stage compressor 6×1.85=the pressure ratio in the low-stage compressor 7.

The illustrated and described turbo charger system is disclosed in Japanese Patent Application No. 11-327236 filed on Nov. 17, 1999, the instant application claims priority of this Japanese Patent Application, and the entire disclosure thereof is incorporated herein by reference.

What is claimed is:

1. A turbo charger system for a diesel engine comprising:
    a high-stage turbine and low-stage turbine provided in series on an exhaust gas line of the diesel engine;
    a high-stage compressor and low-stage compressor provided in series on an intake air line of the diesel engine, the high-stage compressor being operatively coupled to the high-stage turbine and driven by the high-stage turbine, the low-stage compressor being operatively coupled to the low-stage turbine and driven by the low-stage turbine;
    a bypass line provided on the exhaust gas line such that it bypasses the high-stage turbine;
    a bypass valve provided on the bypass line; and
    a controller for controlling an opening degree of the bypass valve such that the bypass valve is completely or substantially completely closed until the diesel engine reaches its maximum torque point at least when the engine is running under a full load condition, gradually opened from the maximum torque point to a maximum output point of the engine, and completely or substantially completely opened at the maximum output point.

2. The turbo charger system according to claim 1, wherein the controller controls the opening degree of the bypass valve in accordance with engine revolution speed.

3. The turbo charger system according to claim 1, wherein the controller controls the opening degree of the bypass valve such that a pressure ratio near the maximum torque point is greater than that near the maximum output point in the high-stage compressor, and a pressure ratio near the maximum output point is greater than that near the maximum torque point in the low-stage compressor.

4. The turbo charger system according to claim 2, wherein the controller controls the opening degree of the bypass valve such that a pressure ratio near the maximum torque point is greater than that near the maximum output point in the high-stage compressor, and a pressure ratio near the maximum output point is greater than that near the maximum torque point in the low-stage compressor.

5. The turbo charger system according to claim 1, wherein the controller controls the opening degree of the bypass valve such that a pressure ratio near the maximum output point in the low-stage compressor is greater than that in the high-stage compressor.

6. The turbo charger system according to claim 2, wherein the controller controls the opening degree of the bypass valve such that a pressure ratio near the maximum output point in the low-stage compressor is greater than that in the high-stage compressor.

7. The turbo charger system according to claim 3, wherein the controller controls the opening degree of the bypass valve such that a pressure ratio near the maximum output point in the low-stage compressor is greater than that in the high-stage compressor.

8. The turbo charger system according to claim 1, wherein the controller controls the opening degree of the bypass valve such that a pressure ratio near the maximum torque point in the high-stage compressor is greater than that in the low-stage compressor.

9. The turbo charger system according to claim 2, wherein the controller controls the opening degree of the bypass valve such that a pressure ratio near the maximum torque point in the high-stage compressor is greater than that in the low-stage compressor.

10. The turbo charger system according to claim 3, wherein the controller controls the opening degree of the bypass valve such that a pressure ratio near the maximum torque point in the high-stage compressor is greater than that in the low-stage compressor.

11. The turbo charger system according to claim 5, wherein the controller controls the opening degree of the bypass valve such that a pressure ratio near the maximum torque point in the high-stage compressor is greater than that in the low-stage compressor.

12. The turbo charger system according to claim 1, wherein the high-stage compressor has a smaller maximum pressure ratio than the low-stage compressor and has a wider high efficiency flow rate range relative to a maximum flow rate than the low-stage compressor.

13. The turbo charger system according to claim 2, wherein the high-stage compressor has a smaller maximum pressure ratio than the low-stage compressor and has a wider high efficiency flow rate range relative to a maximum flow rate than the low-stage compressor.

14. The turbo charger system according to claim 3, wherein the high-stage compressor has a smaller maximum pressure ratio than the low-stage compressor and has a wider high efficiency flow rate range relative to a maximum flow rate than the low-stage compressor.

15. The turbo charger system according to claim 5, wherein the high-stage compressor has a smaller maximum pressure ratio than the low-stage compressor and has a wider high efficiency flow rate range relative to a maximum flow rate than the low-stage compressor.

16. The turbo charger system according to claim 8, wherein the high-stage compressor has a smaller maximum pressure ratio than the low-stage compressor and has a wider high efficiency flow rate range relative to a maximum flow rate than the low-stage compressor.

17. The turbo charger system according to claim 1, wherein a supercharging pressure is solely controlled by the opening degree of the bypass valve.

18. The turbo charger system according to claim 2, wherein a supercharging pressure is solely controlled by the opening degree of the bypass valve.

19. The turbo charger system according to claim 3, wherein a supercharging pressure is solely controlled by the opening degree of the bypass valve.

20. The turbo charger system according to claim 5, wherein a supercharging pressure is solely controlled by the opening degree of the bypass valve.

21. The turbo charger system according to claim 8, wherein a supercharging pressure is solely controlled by the opening degree of the bypass valve.

22. The turbo charger system according to claim 1 further including an intercooler on the intake air line between the high-stage compressor and the low-stage compressor.

23. The turbo charger system according to claim 22 further including an aftercooler on the intake air line between the high-stage compressor and the engine.

* * * * *